UNITED STATES PATENT OFFICE.

GEORGES MICHIELS, OF GUADALOUPE.

IMPROVEMENT IN MAKING SUGAR.

Specification forming part of Letters Patent No. 4,790, dated October 3, 1846.

*To all whom it may concern:*

Be it known that I, GEORGES MICHIELS, residing in Paris, in the Kingdom of France, but now for business in the island of Guadaloupe, have invented a new and useful Improvement in Manufacturing Sugar from Cane or such other Saccharine Plants to which the same is applicable; and I do hereby declare that the following is a full, clear, and exact description of the same.

My process of manufacturing sugar, which is particularly applicable to the sugar-cane, differs from others heretofore used in certain essential particulars. In accomplishing this I adopt an entirely new method of preparing the canes and extracting the saccharine matter from them, during which I employ in contact with the canes so prepared certain chemical matters, in order to render insoluble and inert such chemical agents usually contained in the cane as would be likely to exert an injurious influence upon the saccharine matters.

The treatment of sugar-cane offers in the production or manufacture of sugar many difficulties. The first is to extract all the sugar contained in it. The second is to do the same without its being followed by the extraction of azoted substances—such as curd or albumen—or by non-azoted principles—such as cerosic pectine and other foreign bodies—which require afterward to be separated from the saccharine juice by clarification—an operation unavoidably attended with a notable loss of sugar. The third difficulty which demands the attention of the manufacturer is to neutralize at starting the vegetable acids which are in the organization of the cane, and before they can have reacted on the crystallizable sugar and caused its metamorphosis into its congenerous glucose. This immediate neutralization is one of the imperious conditions attached to all rational methods of proceeding upon the sugar-cane which has not been mentioned yet. Let us observe in relation thereto that if in a dissolution of pure sugar we introduce a quantity, infinitely small in proportion, of an active acid—sulphuric acid, for example—and that we heat the liquor, as it is the custom to do the wine extracted from the cane, such sugar will be converted into glucose. Now, the power of the acids of the cane is well known. We know that they decompose sulphates. We are then warranted in concluding by induction that the vegetable acids in the organism of the cane hold a distinct place from the saccharine matter; and we must lay down as a fact that every system of manufacturing by which the cane is crushed, broken, flattened, or undergoes any rending whatever is imperfect, inasmuch as it causes the metamorphosis of a greater or less important quantity of crystallizable sugar by the effusion of the vegetable acids. What I have just said of vegetable acids applies equally to azoted substances, their rapid decomposition transmitting itself to the sugar, a particular unstable body, which assumes another molecular clustering when under the influence of the smallest chemical force. As to the non-azoted immediate principles they must be eliminated to avoid impeding crystallization by their viscosity. The conclusion to which I have been led by these rational inductions can leave no doubt in the mind, for experience proves it by an undeniable fact which is met with in the way the cane works in Louisiana. In that country it sometimes happens that there is frost before the whole crop is cut. This in no way affects the amount of produce if the planter succeeds in getting through his operations before the arrival of the thaw. On the contrary, if he is overtaken by such change of temperature before having made his sugar, he experiences a great loss in the yielding of the cane. Now, as the direct action of the frost on sugar is without ulterior influence, the phenomenon, I repeat, must then be brought about by some indirect influence. In fact, water is expanded by the frost, that, filling the fibrous vascular cells undergoing this expansion, suddenly occupies a greater space, and consequently bursts the cells of which the internal structure of this monocotyledon is composed. So long as the substances continue in a solid state this bursting has no effect; but as soon as the change in the temperature has brought them back to their primary state there is inevitably an effusion through the disorganized tissues, and that alteration of the sugar begins of which the planter has to bear the evil consequences.

The systems now generally in use operate precisely in the same way as the frost. They mix what nature in her wisdom has separated. They complicate what is simple in its origin, in order to get back only to the starting-point saccharine water, after having destroyed the greater portion of the sugar during a series of ill-conceived operations. The normal composition of the cane gives as near as may be eighteen of sugar, ten of ligneous substance, seventy-two of water; total, one hundred.

By the process heretofore and now generally in use the planters seldom realize from the cane more than seven and one-half per cent. of sugar, whereas nature has placed at their disposal eighteen per cent.

In my improved mode of treating the cane it is first to be cut into very thin slices by means of any suitable apparatus which will work without vibration or shock to such degree as to prevent the acids of the plant during the operation from mingling with the saccharine matter. The division of the cane into slices of from one-thirtieth to one-tenth of an inch in thickness is what I recommend as the maximum thickness, because the vascular vessels which contain the sugar have innumerable ramifications, and at their various points of junction become clammy or coagulated, from which we must admit that the sugar is secreted in small cylinders closed at their extremities, and that consequently to extract the sugar the said cylinders require to be cut or opened—a condition which presupposes a division of the cane into thin slices cut perpendicularly to the axis of the plant, or in very thin slices if the cane be cut in a direction inclined to those vessels. A microscopic examination of the tissue of the cane has led me to fix the maximum thickness of the slices at one-tenth of an inch—a limit which in my opinion ought never to be exceeded. I consider one-thirtieth of an inch more favorable to the complete extraction of the sugar.

In my plan or method I particularly avoid wounding or injuring the tissue of the cane, that being one of the most essential and principal parts of my invention. I have already said that the sugar is found separate or isolated in the vascular vessels; but it must be borne in mind that the cane contains other substances than sugar. Chemistry distinguishes caseine, albumen, a free acid or malic acid, pectine, the electro-negative transformation of this latter—viz., pectic acid, a fatty substance, cerosine (a substance analogous to wax found upon the surface of the cane,) chlorophyl, sulphate of alumina, sulphate of potassium, biphosphate of lime, silicate of potassium and of soda, and silica, substances which, the silica and chlorophyl excepted, exercise a decomposing influence upon the sugar—a body exceedingly unstable or changeable, and which assumes different molecular forms under the slightest chemical agency. To prevent the mixture of those substances with the sugar is the next important step of my improved process, and which consists in dissolving the sugar from the slices of cane by immersing immediately said slices in water heated to a uniform temperature from 127° to 212° Fahrenheit, in order to facilitate the process; also, at the same time, by certain chemical agents introduced into the water, rendering insoluble or inert those matters which would otherwise exert an injurious influence or chemical action upon the saccharinal matters. For this purpose I make use of certain machinery which I have invented, and which is peculiarly applicable thereto, and for which it is my intention to obtain a separate patent, but which it is not necessary here to further describe, as a cane-cutter of any shape, common vats or boiling-vessels, with a suitable heating apparatus applied to it, suffice for our purpose.

Into the vats of water the chemical agent which I introduce is a small quantity of caustic or unslaked lime, which will form or produce, combined with the before-mentioned organic elements, caseate of lime, albuminate of lime, malate of lime, a soap of lime, which, being insoluble, are consequently fixed in the tissue of the cane. The same observation applies itself to the biphosphate of lime, which in contact with an excess of base will become an insoluble neutral salt. This preparatory reaction or chemical operation once completed, the sugar remains in its naturally pure state, provided the cane be cut into slices, as before explained, without being lacerated or injured, and we may, to facilitate its dissolution, employ any means which will not destroy its chemical stability. After the dissolution of the sugar has been effected the liquor is to be separated from the mass of slices, and the slices when dried serve the purpose of fuel, or they may be used in my improved gas-furnace for the production of gas for lighting and heating.

If my explanation be correctly understood, it will be clearly seen that by employing my process the sugar cannot separate from the vascular vessels by the natural inflation and contraction thereof, all permeability and contractability of the tissues of the cane being prevented by the effect of the above-described operation for coagulating and neutralizing the organic elements of the cane. Consequently, the sugar can only be extracted from the cane by being dissolved, and this corroborates what I have said about the necessity of dividing or cutting the cane into thin slices for the purpose of opening the vascular vessels. These considerations equally demonstrate that in order to extract all the saccharine matter from the cane the relative proportions of the different substances must be preserved during the cutting or dividing operation in order to prevent their extravasation, which by coagulating would close or obstruct the vascular vessels.

The succeeding or last portion of my process consists in the extraction of the excess of lime and the chlorophyl from the saccharine solution, and this I effect by precipitating them by a small quantity of oxalate of alumina.

For this purpose I have devised certain mechanism, which I shall in all probability describe in the specification of a future application for a patent, but which it is not necessary here to notice. Thus a colorless juice is obtained entirely free from lime, and after filtration, through any filter whatever, the saccharine solution may be evaporated for the purpose of converting it into sugar.

Having thus described my discovery, I shall claim—

1. My hereinbefore specified improved manner of preparing the canes or saccharine plants, treating them, and extracting the sugar by dissolution, the same consisting in cutting the canes or plants transversely through their saccharine cells and into very thin slices, immersing them in hot water, and rendering insoluble and inert during the process of dissolution such chemical substances of the cane as would otherwise exert an injurious influence or chemical action upon the saccharine matters.

2. The use of oxalate of alumina, as above set forth, for the purpose of exerting the necessary chemical action upon the aforesaid combination of sirup, chlorophyl, and the superabundance of lime, in order to remove these two substances, and particularly the lime, that extraneous chemical matter used to render inert those substances which would otherwise prove injurious to the sugar during the process of its dissolution from the cane, as described.

In testimony whereof I have hereto set my signature this 7th day of August, 1846.

G. MICHIELS.

Witnesses:
    JHN. CHOMANY DUBISSON,
    BARRERE.